United States Patent
Arcella et al.

(10) Patent No.: US 6,509,073 B1
(45) Date of Patent: *Jan. 21, 2003

(54) CROSSLINKED COMPOSITIONS OF THERMOPLASTIC FLUOROPOLYMERS

(75) Inventors: Vincenzo Arcella, Milan (IT); Julio A. Abusleme, Varese (IT)

(73) Assignee: Ausimont S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/528,199

(22) Filed: Mar. 17, 2000

(30) Foreign Application Priority Data

Mar. 19, 1999 (IT) .......................... MI99A0548

(51) Int. Cl.$^7$ .......................... B32B 27/16; B32B 27/30; B32B 27/32; B32B 27/34; B32B 27/36
(52) U.S. Cl. .................. 428/36.91; 428/35.7; 428/36.9; 428/421; 428/422; 428/412; 428/424.6; 428/473.5; 428/476.3; 428/483; 428/510; 428/514; 428/515; 428/516; 428/520; 428/522; 174/110 FC; 526/242; 526/245; 138/137; 138/140; 138/145; 138/146
(58) Field of Search .................. 428/421, 422, 428/35.7, 36.9, 36.91; 526/242, 245; 138/137, 140, 145, 146; 174/110 R, 120 R, 121 AR, 121 SR, 120 AR, 120 SR, 110 AR, 110 FC

(56) References Cited

U.S. PATENT DOCUMENTS

| | | | | |
|---|---|---|---|---|
| 3,738,923 A | | 6/1973 | Carlson et al. .......... 204/159.2 |
| 3,763,222 A | | 10/1973 | Aronoff et al. ............. 260/475 |
| 3,840,619 A | | 10/1974 | Aronoff et al. ............. 260/878 |
| 3,893,971 A | * | 7/1975 | Ukihashi et al. ........ 260/45.7 R |
| 3,947,525 A | * | 3/1976 | Robertson et al. ..... 204/159.17 |
| 4,039,631 A | | 8/1977 | Robertson et al. .......... 260/878 |
| 4,041,237 A | * | 8/1977 | Stine et al. .................... 174/36 |
| 4,121,001 A | | 10/1978 | Gotcher et al. ............... 428/35 |
| 4,133,798 A | * | 1/1979 | Nishimura et al. .... 260/45.7 R |
| 4,184,011 A | * | 1/1980 | Hildreth ..................... 428/383 |
| 4,338,237 A | * | 7/1982 | Sulzbach et al. ........... 524/777 |
| 5,043,390 A | * | 8/1991 | Koichi et al. ................ 525/200 |
| 5,059,483 A | * | 10/1991 | Lunk et al. .................. 428/383 |
| 5,612,419 A | | 3/1997 | Arcella et al. .............. 525/252 |
| 5,718,957 A | * | 2/1998 | Yokoe et al. ............ 428/36.91 |
| 6,017,626 A | * | 1/2000 | Hildreth ..................... 428/373 |
| 6,107,393 A | * | 8/2000 | Abusleme et al. .......... 524/545 |

FOREIGN PATENT DOCUMENTS

FR 2 494 702 5/1992

OTHER PUBLICATIONS

Derwent Publications Ltd., London, GB; AN 1993–061386; XP–002141970 (JP 05 008353).
Derwent Publications Ltd., London, GB; AN 1990–187904; XP–002141971 (JP 02 121206).
Derwent Publications Ltd., London, GB; AN 1995–101909; XP–002141972 (JP 07 025954).

* cited by examiner

*Primary Examiner*—Vivian Chen
(74) *Attorney, Agent, or Firm*—Arent Fox Kintner Plotkin & Kahn PLLC

(57) ABSTRACT

Crosslinked polymer compositions obtained by subjecting to ionizing radiations compositions comprising:

I) thermoprocessable copolymers of ethylene with tetrafluoroethylene (TFE) and/or chlorotrifluoroethylene (CTFE) modified with acrylic monomers of formula:

$$CH_2=CH-CO-O-R_2 \qquad (a)$$

$R_2$ is a hydrogenated radical from 1 to 20 carbon atoms, $C_1-C_{20}$, alkyl, linear and/or branched radical, or cycloalkyl, or $R_2$ is H. The radical $R_2$ can optionally contain: heteroatoms preferably Cl, O, N; one or more functional groups preferably selected from OH, COOH, epoxide, ester and ether; and double bonds;

II) one or more cross-linking agents;

III) one or more optional ingredients.

24 Claims, No Drawings

CROSSLINKED COMPOSITIONS OF THERMOPLASTIC FLUOROPOLYMERS

The present invention relates to fluorinated crosslinked polymers modified with hydrogenated monomers, the processes for obtaining them and the manufactured articles therefrom.

In particular the invention relates to curable compositions, comprising thermoprocessable copolymers of ethylene (E) with tetrafluoroethylene (TFE) and/or chlorotrifluoroethylene (CTFE) modified with acrylic monomers, subjected to ionizing radiations comprising X rays, gamma rays, electron beams and the like. The preferred sources of ionizing radiation include Cobalt-60, which emits high penentration gamma radiations and high energy electron beams.

It is well known in the art the crosslinking of the thermoprocessable ETFE and ECTFE copolymers by ionizing radiations (U.S. Pat. No. 3,738,923) also in the presence of crosslinking agents well known in the prior art such as triallylisocyanurate (TAIC), triallylcyanurate (TAC) and others, as reported in U.S. Pat. No. 3,763,222, U.S. Pat. No. 3,840,619, U.S. Pat. No. 4,039,631 and U.S. Pat. No. 4,121,001.

Unfortunately, to obtain a meaningful improvement of the mechanical properties higher doses of ionizing radiation are required. For example in the case of $\gamma$ radiation, higher than 10 megarad (MRad), must be used. It is well known that high levels of irradiation can be obtained by using high intensity irradiation systems which are complex for safety reasons, or by irradiating with a low intensity irradiation system for longer times. Both cases are economically disadvantageous. Furthermore and most important, a high dose of radiation implies the strong risk to decompose the starting polymer with possible formation of gaseous products.

It would be therefore desirable to operate at the lowest possible level of radiation intensity obtaining a crosslinked product having improved mechanical properties.

It is known the use of the ETFE and ECTFE thermoprocessable polymers as materials for the electric insulation as wire insulation and jacketing cables. Besides, it is also known that the crosslinking improves the mechanical properties of the fluoropolymers at high temperatures.

In view of the above, it was desirable to increase the thermal rating of the fluoropolymers used as wire insulation or as jacketing cable, by improving their mechanical properties at high temperatures, in particular increasing the stress at break without jeopardizing the elongation at break.

The Applicant has surprisingly and unexpectedly found a crosslinked polymer composition of thermoprocessable copolymers of ethylene (E) with tetrafluoroethylene (TFE) and/or chlorotrifluoroethylene (CTFE) modified with acrylic monomers and a crosslinking agent, which subjected to ionizing radition, are capable to crosslink at very low radiation levels, at which the ETFE and ECTFE copolymers do not crosslink, without decomposition of the thermoprocessable copolymer achieving improved mechanical properties at high temperatures. In particular the increase of the stress at break without jeopardizing the elongation at break which remains higher than 100%, conditions which are required in wire insulation and jacketing cable applications.

Therefore, an object of the present invention are crosslinked polymer compositions obtainable by subjecting to ionizing radiations compositions comprising:

I) thermoprocessable copolymers of ethylene with tetrafluoroethylene (TFE) and/or chlorotrifluoroethylene (CTFE) modified with acrylic monomers of formula:

$$CH_2=CH-CO-O-R_2 \qquad (a)$$

$R_2$ is a hydrogenated radical from 1 to 20 carbon atoms, $C_1-C_{20}$, alkyl, linear and/or branched radical, or cycloalkyl, or $R_2$ is H. The radical $R_2$ can optionally contain: heteroatoms preferably Cl, O, N; one or more functional groups preferably selected from OH, COOH, epoxide, ester and ether; and double bonds;

II) one or more cross-linking agents;

III) one or more optional ingredients.

The thermoprocessable copolymers of component I) comprise from 10 to 70%, preferably from 35 to 55%, by moles of ethylene, from 30 to 90%, preferably from 45 to 65%, by moles of a fluorinated monomer selected from tetrafluoroethylene, chlorotrifluoroethylene, or mixtures thereof, from 0.1 to 30%, preferably from 1 to 15% by moles of the comonomer (a).

The preferred fluorinated monomer of component I) is chlorotrifluoroethylene.

n-Butylacrylate (n-BuA) is the preferred acrylic monomer.

The cross-linking agents of component II) can be for example triallylisocyanurate (TAIC), triallylcyanurate (TAC), diallylisophthalate (U.S. Pat. No. 4,039,631), diallylterephthalate (U.S. Pat. No. 4,039,631), esters of phenyl indan (U.S. Pat. No. 3,763,222), triallylester of the aryl polycarboxylic acid (U.S. Pat. No. 3,840,619), bisolefins such as for example 1,6 divinylperfluorohexane (see U.S. Pat. No. 5,612,419) and others (see U.S. Pat. No. 4,121,001).

The preferred crosslinking agent is triallylisocyanurate.

The cross-linking agent amounts ranges from 0.1 to 10.0% by weight, preferably from 0.3 to 5.0% by weight, more preferably from 0.5 to 2.0% by weight referred to the crosslinkable composition.

The components III) can be fillers (for example polytetrafluoroethylene (PTFE), silicates), smoke retarders, lubricants, pigments, fire retardants, intumescent agents, plasticizers (for example MORFLEX® 560), metal oxides (ZnO, MgO), thermal stabilizers such as for example Irganox® 1010. The maximum total amount of said optional ingredients is 30.0% by weight referred to the crosslinkable composition.

A further object of the present invention is a crosslinking process by ionizing radiations of the crosslinkable polymer compositions of the invention.

The ionizing radiations used for the crosslinking can be X rays, $\gamma$ rays, electron beams, deuterons, $\alpha$ particles or their combinations. The radiation amounts can range from 0.1 to 10 Mrad, preferably from 0.2 to 5 Mrad, more preferably from 0.5 to 2 Mrad.

Another object of the present invention are manufactured articles of the crosslinked polymer compositions of the invention, in particular cables.

Furthermore it is possible to obtain multilayer manufactured articles by irradiating the multilayer article of crosslinkable polymer compositions of the present invention and hydrogenated polymers. Applications of particular interest are, in the car industry, the preparation of fuel lines and fuel hoses which are multilayer manufactured articles of hydrogenated and fluorinated polymers. For fuel lines is meant essentially a bilayer system of thermoplastic hydrogenated polymers and crosslinkable polymer compositions of the present invention, and then irradiated as above mentioned. For fuel hoses is meant essentially a bilayer system of hydrogenated elastomers and crosslinkable polymer compositions of the present invention, and then irradiated as above mentioned. Therefore, a further object of the present invention are multilayer articles of crosslinked polymer compositions of the present invention and hydrogenated polymers.

As examples of hydrogenated polymers we can mention thermoplastic polymers, and hydrogenated elastomers.

- as thermoplastic polymers: for example cellulose polymers, polyamides such as NYLON 6, NYLON 66, NYLON 11, NYLON 12, polyamide copolymers, polycarbonates, polyesters, such as polyethylenterephthalate, polyester copolymers, polyolefins such as high and low density polyethylene, olefine copolymers, polyimides, polystyrene, polyurethanes, polyvinylchloride (PVC), polysulphones, ethylene/vinylacetate copolymers, polyacrylbutadienestyrene (ABS);
- as elastomeric hydrogenated polymers: for example acrylic rubbers, nitrile rubbers (NBR), ethylene-propylene rubbers (EPM), ethylene-propylene-diene rubbers (EPDM), NVC rubbers (nitrile NBR rubbers mixed with PVC), epichlorohydrin rubbers (CO and ECO).

In particular for fuel lines applications polyamides are preferred. For fuel hoses applications epichlorohydrin and nitrile rubbers (NBR) are preferred.

For the preparation of fuel lines the coextrusion of polyamides and of the components I), II) and III), and then irradiating with ionizing radiations is preferred. For the preparation of the fuel hoses the extrusion of the hydrogenated rubber on a tube formed of components I), II) and III), and then irradiating with ionizing radiations is preferred.

Some examples of the present invention are hereinafter reported, the purpose of which is merely illustrative but not limitative of the scope of the invention itself.

EXAMPLE 1

1.1—Preparation of the "Polymer A" (E/CTFE/n-BuA 40/55/5 Moles %)

In an enamelled autoclave equipped with baffle and stirrer working at 450 rpm of Hastelloy C, 5.3 l of demineralized water, 1.7 l of methyl alcohol, 20 ml of methylcyclopentane, 10 g of n-butylacrylate and 2 kg of chlorotrifluoroethylene were introduced. The autoclave was then heated to the reaction temperature of 15° C. and ethylene was fed up to a pressure of 8.2 absolute bar. In the autoclave the radical initiator was then continuously fed during the polymerization under the form of a trichloroacetylperoxide (TCAP) solution in isooctane, maintained at −17° C., having a titre equal to 0.1 g TCAP/ml. Furthermore 10 g of n-butylacrylate were fed at consumption of 20, 40, 60, 80, 100, 120, 140, 160 and 180 g of ethylene.

The pressure was maintained constant during the polymerization by continuously feeding ethylene to the reactor up to a consumption of 200 g; in total 399 ml of initiator solution were introduced. The polymerization lasted 555 minutes.

The product discharged from the autoclave was dried at 120° C. for about 16 hours. The amount of dry product was 1200 g. The obtained product is defined "Polymer A".

The mechanical properties at 23° C. are reported in Table 1 and at 120° C. in Table 4, obtained according to the ASTM D1708 method by using compression molded specimens of the polymer A.

1.2—Preparation of the "Polymer A'": Polymer A+ TAIC 1% by Weight

The polymer A was additivated with TAIC at 1% by weight and as optional components MARK-260® in an amount of 0.45% by weight and Aclyn-316® in an amount of 0.15% by weight, both mainly used as thermal stabilizers.

The obtained polymer, defined "Polymer A'", is pelletized at a maximum temperature of 240° C., in a single screw Brabender extruder of Hastelloy C-276 having a 18 mm diameter and a length equivalent to 25 times the diameter.

The mechanical properties at 23° C. are reported in Table 1 and at 120° C. in Table 4, obtained according to the ASTM D1708 method by using compression molded specimens of the polymer A'.

1.3—Ionizing Radiation Treatment

The polymer A' was compression molded at 240° C. for 8 minutes at 40 bar obtaining specimens of 0.3 mm thickness. One specimen is treated with 1 MRad and another one with 5 MRad of γ radiation emitted by a Cobalt-60 source.

The mechanical properties at 23° C. are reported in Table 1 and at 120° C. in Table 4, obtained according to the ASTM D1708 method, of the specimens treated with ionizing radiation.

EXAMPLE 2 COMPARATIVE

2.1—Preparation of the "Polymer B" (E/CTFE 49/51 Moles %)

In an enamelled autoclave equipped with baffle and stirrer working at 450 rpm of Hastelloy C, 5.3 l of demineralized water, 1.7 l of methyl alcohol, 52 ml of methylcyclopentane and 2 kg of chlorotrifluoroethylene were introduced. The autoclave was then heated to the reaction temperature of 15° C. and ethylene was fed up to a pressure of 12.6 absolute bar. In the autoclave the radical initiator was then continuously fed (40 ml/h) during the polymerization under the form of a trichloroacetylperoxide (TCAP) solution in isooctane, maintained at −17° C., having a titre equal to 0.12 g TCAP/ml.

The pressure was maintained constant during the polymerization by continuously feeding ethylene to the reactor up to a consumption of 200 g; in total 200 ml of initiator solution were introduced.

The product discharged from the autoclave was dried at 120° C. for about 16 hours. The amount of dry product was 1507 g. The obtained product is defined "Polymer B".

The mechanical properties at 23° C. are reported in Table 2 and at 120° C. in Table 5, obtained according to the ASTM D1708 method by using compression molded specimens of polymer B.

2.2—Preparation of the "Polymer B'": Polymer B+ TAIC 1% by Weight

The polymer B was additivated with TAIC at 1% by weight and as optional components MARK-260® in an amount of 0.45% by weight and Aclyn-316® in an amount of 0.15% by weight both used as thermal stabilizers.

The obtained polymer, defined "Polymer B'", is pelletized at a maximum temperature of 270° C., in a single screw Brabender extruder of Hastelloy C-276 having a 18 mm diameter and a length equivalent to 25 times the diameter.

The mechanical properties at 23° C. are reported in Table 2 and at 120° C. in Table 5, obtained according to the ASTM D1708 method by using compression molded specimens of polymer B'.

2.3—Ionizing Radiation Treatment

The polymer B' was compression molded at 240° C. for 8 minutes at 40 bar obtaining specimens of 0.3 mm thickness. One specimen is treated with 1 MRad and another one with 5 MRad of γ radiation emitted by a Cobalt-60 source.

The mechanical properties at 23° C. are reported in Table 2 and at 120° C. in Table 5, obtained according to the ASTM D1708 method, of the specimens treated with ionizing radiation.

EXAMPLE 3 COMPARATIVE

3.1—Preparation of "Polymer C" (E/CTFE 45/55 Moles %)

Example 1.1 was repeated except that the n-butylacrylate monomer was not introduced. The obtained product is defined "Polymer C".

In Table 3 the mechanical properties at 23° C. obtained according to the ASTM D1708 method by using compression molded specimens of polymer C, are reported.

3.2—Preparation of "Polymer C'": Polymer C+ TAIC 1% by Weight

The procedure of Example 1.2 was repeated by applying it to the polymer C. The obtained product is defined "Polymer C'".

In Table 3 the mechanical properties at 23° C. obtained according to the ASTM D1708 method by using compression molded specimens of polymer C', are reported.

3.3—Ionizing Radiation Treatment

The procedure of Example 1.2 was repeated by applying it to the Polymer C'.

In Table 3 the mechanical properties at 23° C. obtained according to the ASTM D1708 method of the specimen of polymer C' treated with ionizing radiation are reported. From the comparison of the Tables it is observed that the curable polymer compositions according to the present invention are capable to crosslink at levels of ionizing radiations at which the ECTFE copolymer does not crosslink. This is shown from the per cent increase of the stress at break at 23° C. and at 120° C. without jeopardizing the elongation at break.

TABLE 1

| Mechanical properties at 23° C. | Polymer A | Polymer A' | Polymer A' (treated with 1 MRad) | Polymer A' (treated with 5 MRad) |
|---|---|---|---|---|
| Elastic modulus (MPa) | 1440 | 1441 | 1494 | 1486 |
| Yield stress (MPa) | 34.8 | 36.9 | 38.7 | 37.7 |
| Elongation at break (%) | 246 | 255 | 224 | 197 |
| Stress at break (MPa) | 43.0 | 45.0 | 48.3 | 48.8 |
| % Variation of stress at break | — | 4.7 | 12.3 | 13.5 |

TABLE 2

| Mechanical properties at 23° C. | Polymer B | Polymer B' | Polymer B' (treated with 1 MRad) | Polymer B' (treated with 5 MRad) |
|---|---|---|---|---|
| Elastic modulus (MPa) | 1480 | 1488 | 1564 | 1567 |
| Yield stress (MPa) | 32.2 | 34.0 | 34.9 | 34.9 |

TABLE 2-continued

| Mechanical properties at 23° C. | Polymer B | Polymer B' | Polymer B' (treated with 1 MRad) | Polymer B' (treated with 5 MRad) |
|---|---|---|---|---|
| Elongation at break (%) | 241 | 302 | 266 | 272 |
| Stress at break (MPa) | 55.4 | 57.7 | 54.6 | 55.6 |
| % Variation of stress at break | — | 4.2 | −1.4 | 0.4 |

TABLE 3

| Mechanical properties at 23° C. | Polymer C | Polymer C' | Polymer C' (treated with 1 MRad) | Polymer C' (treated with 5 MRad) |
|---|---|---|---|---|
| Elastic modulus (MPa) | 1238 | 1307 | 1336 | 1311 |
| Yield stress (MPa) | 28.1 | 32.0 | 32.9 | 31.9 |
| Elongation at break (%) | 336 | 353 | 343 | 316 |
| Stress at break (MPa) | 41.8 | 42.7 | 43.2 | 42.1 |
| % Variation of stress at break | — | 2.1 | 3.3 | 0.7 |

TABLE 4

| Mechanical properties at 120° C. | Polymer A | Polymer A' | Polymer A' (treated with 1 MRad) | Polymer A' (treated with 5 MRad) |
|---|---|---|---|---|
| Elastic modulus (MPa) | 7 | 6 | 5 | 6.5 |
| Yield stress (MPa) | 1.1 | 1.1 | 1.2 | 1.4 |
| Elongation at break (%) | 724 | 696 | 721 | 434 |
| Stress at break (MPa) | 1.7 | 1.7 | 6.5 | 5.8 |
| % Variation of stress at break | — | 0 | 282 | 240 |

TABLE 5

| Mechanical properties at 120° C. | Polymer B | Polymer B' | Polymer B' (treated with 1 MRad) | Polymer B' (treated with 5 MRad) |
|---|---|---|---|---|
| Elastic modulus (MPa) | 150 | 127 | 129 | 142 |
| Yield stress (MPa) | 6.0 | 6.0 | 5.8 | 6.0 |
| Elongation at break (%) | 864 | 907 | 857 | 798 |
| Stress at break (MPa) | 19.0 | 17.2 | 17.3 | 18.6 |
| % Variation of stress at break | — | −9.5 | −8.9 | −2.1 |

What is claimed is:

1. Crosslinked polymer compositions obtained by subjecting to ionizing radiations compositions comprising:
   I) thermoprocessable copolymers of ethylene with tetrafluoroethylene (TFE) and/or chlorotrifluoroethylene (CTFE) modified with acrylic monomers of formula:

$$CH_2=CH-CO-O-R_2 \qquad (a)$$

$R_2$ is a hydrogenated radical from 1 to 20 carbon atoms, $C_1-C_{20}$, alklyl, linear and/or branched radical, or cycloalkyl, or $R_2$ is H, wherein the radical $R_2$ can optionally contain heteroatoms selected from the group consisting of Cl, O, N; one or more functional groups selected from the group consisting of OH, COON, epoxide, ester and ether; and double bonds;

II) one or more cross-linking agents;

III) one or more ingredients.

2. Compositions according to claim 1 wherein the thermoprocessable copolymers of component I) are constituted from 10 to 70% by moles of ethylene, from 30 to 90% by moles of a fluorinated monomer selected from the group consisting of tetrafluoroethylene, chlorotrifluoroethylene, or mixtures thereof, from 0.1 to 30% by moles of the comonomer (a).

3. Compositions according to claim 2 wherein the fluorinated monomer of component I) is chlorotrifluoroethylene.

4. Compositions according to claim 2 wherein the thermoprocessable copolymers of component I) are constituted from 35 to 55% by moles of ethylene.

5. Compositions according to claim 2 wherein the thermoprocessable copolymers of component I) are constituted from 45 to 65% by moles of the fluorinated monomer.

6. Compositions according to claim 2 wherein the thermoprocessable copolymers of component I) are constituted from 1 to 15% by moles of the comonomer (a).

7. Compositions according to claim 1 wherein the acrylic monomers of formula (a) are n-butylacrylate.

8. Compositions according to claim 1 wherein the crosslinking agents are selected from the group consisting of triallylisocyanurate (TAIC), trial lylcyanurate (TAC), diallylisophthalate, diallylterephthalate, phenyl indene esters, triallylester of the aryl polycarboxylic acid, and bis-olefins.

9. Compositions according to claim 8 wherein the crosslinking agent is triallylisocyanurate.

10. Compositions according to claim 1 wherein the crosslinking agent amount is in the range 0.1–10.0 by weight of the composition subjected to crosslinking.

11. Compositions according to claim 10 wherein the cross-linking agent amount is in the range 0.3–5.0% by weight of the composition subjected to crosslinking.

12. Compositions according to claim 11 wherein the cross-linking agent amount is in the range 0.5–2.0% by weight of the composition subjected to crosslinking.

13. Compositions according to claim 1 wherein the optional ingredients are selected from the group consisting of fillers, smoke retarders, lubricants, pigments, fire retardants, intumescent agents, plasticizers, metal oxides and thermal stabilizers.

14. Compositions according to claim 13 wherein the maximum total amount of the optional ingredients is 30.0% by weight of the composition subjected to crosslinking.

15. A crosslinking process by ionizing radiations for obtaining compositions according to claim 1 wherein the ionizing radiations are selected from the group consisting of X rays, y rays, electron beams, deuterons, a particles or their combinations.

16. A process according to claim 15 wherein the radiation amounts range from 0.1 to 10 Mrad.

17. A process according to claim 16 wherein the radiation amounts range from 0.2 to 5 Mrad.

18. A process according to claim 17 wherein the radiation amounts range from 0.5 to 2 Mrad.

19. Manufactured articles obtainable from the compositions according to claim 1.

20. Manufactured articles according to claim 19 wherein the manufactured articles are cables.

21. Multilayer manufactured articles comprising hydrogenated polymers and crosslinkable polymer compositions according to claim 1, then subjecting to ionizing radiations.

22. Multilayer manufactured articles according to claim 21 wherein the hydrogenated polymers are:

thermoplastic hydrogenated polymers selected from the group consisting of: cellulose polymers, polyamides, polyamide copolymers, polycarbonates, polyesters, polyester copolymers, polyolefins, olefine copolymers, polyimides, polystyrene, polyurethanes, polyvinylchloride (PVC), polysulphones, ethylene/vinylacetate copolymers and polyacrylbutadienestyrene (ABS);

hydrogenated elastomers selected from the group consisting of: acrylic rubbers, nitrile rubbers (NBR), ethylenepropylene rubbers (EPM), ethylene-propylene-diene rubbers (EPDM), NVC rubbers (nitrile NBR rubbers mixed with PVC) and epichlorohydrin rubbers (CO and ECO).

23. Multilayer manufactured articles according to claim 22 wherein the thermoplastic hydrogenated polymers are polyamides; and the hydrogenated elastomers are the epichlorohydrin and nitrile rubbers (NBR).

24. Manufactured articles according to claim 21–23 wherein the manufactured articles are fuel lines and fuel hoses.

* * * * *